(12) United States Patent
Lee

(10) Patent No.: US 11,788,635 B2
(45) Date of Patent: Oct. 17, 2023

(54) HOT AND COLD WATER FAUCET

(71) Applicant: Man Hon Lee, Kowloon (HK)

(72) Inventor: Man Hon Lee, Kowloon (HK)

( * ) Notice: Subject to any disclaimer, the term of this patent is extended or adjusted under 35 U.S.C. 154(b) by 0 days.

(21) Appl. No.: 17/693,423

(22) Filed: Mar. 14, 2022

(65) Prior Publication Data

US 2023/0287983 A1    Sep. 14, 2023

(51) Int. Cl.
*F16K 11/22* (2006.01)
*E03C 1/05* (2006.01)

(52) U.S. Cl.
CPC ............... *F16K 11/22* (2013.01); *E03C 1/05* (2013.01)

(58) Field of Classification Search
CPC ...... F16K 11/22; F16K 19/006; F16K 11/207; E03C 1/05; E03C 1/0403
See application file for complete search history.

(56) References Cited

U.S. PATENT DOCUMENTS

| | | | | |
|---|---|---|---|---|
| RE30,559 E | * | 3/1981 | Schmitt | F16K 19/006 137/315.12 |
| 7,216,663 B2 | * | 5/2007 | Vu | F16K 19/006 137/119.04 |
| 8,689,818 B2 | * | 4/2014 | Marty | E03C 1/0404 4/678 |
| 8,881,755 B2 | * | 11/2014 | Thomas | F16K 11/0743 137/271 |
| 10,415,216 B2 | * | 9/2019 | Bornovolokov | F16K 3/08 |

\* cited by examiner

*Primary Examiner* — Michael R Reid

(57) ABSTRACT

A hot and cold water faucet, including a hot and cold water mixer, a hot water valve, a cold water valve, a hot water rotating assembly, a cold water rotating assembly, a hot water connecting component and a cold water connecting component; the hot and cold water mixer has a hot water inlet connected with the hot water valve, a cold water inlet connected with the cold water valve, and a mixed water outlet; the hot water valve is provided with a hot water valve core; the cold water valve is provided with a cold water valve core; a rotating part of the hot water rotating assembly and the hot water valve core are connected with the hot water connecting component; a rotating part of the cold water rotating assembly and the cold water valve core are connected with the cold water connecting component.

14 Claims, 8 Drawing Sheets

HOT AND COLD WATER FAUCET

A hot and cold water faucet

BACKGROUND OF THE UTILITY MODEL

The present utility model relates to faucet and more particularly pertains to a hot and cold water faucet.

A number of hot and cold water faucets available in the market can control the temperature of water coming out from the faucet. Hot and cold water faucet works in the way that rotating the valve cores of the valve can control the aperture of the hot water inlet or the cold water inlet to control the mixing ratio of hot and cold water. For the hot and cold water faucets in the market, the valve cores with handles are provided on the washbasin for easy rotation. As valve cores are in direct contact with water, water leakage will occur once they are damaged. As a result, water will accumulate on the washbasin and users' clothes will get wet, and hence affect the user experience of the present hot and cold water faucets once the valve cores are damaged.

BRIEF SUMMARY OF THE INVENTION

In view of the aforesaid disadvantages now present in the prior art, the present utility model provides a hot and cold water faucet which will not cause water to accumulate on the countertop even if the valve cores are damaged.

To attain this, the technical solution of the present utility model adopts the following scheme:

A hot and cold water faucet, comprising a hot and cold water mixer, a hot water rotating assembly mounted on a sink deck, a cold water rotating assembly mounted on the sink deck, a hot water valve positioned immediately adjacent to the hot and cold water mixer and under the sink deck, a cold water valve positioned immediately adjacent to the hot and cold water mixer and under the sink deck, a hot water connecting component and a cold water connecting component; the hot and cold water mixer is provided with a hot water inlet, a cold water inlet and a mixed water outlet; a water outlet end of the hot water valve is in communication with the hot water inlet, and a water outlet end of the cold water valve is in communication with the cold water inlet; the hot water valve is provided with a hot water valve core; the hot water rotating assembly comprises a first fixing part and a first rotating part rotatably connected with the first fixing part; the first rotating part of the hot water rotating assembly and the hot water valve core are respectively connected with the hot water connecting component; the first rotating part drives the hot water valve core to rotate via the hot water connecting component; the cold water valve is provided with a cold water valve core; the cold water rotating assembly comprises a second fixing part and a second rotating part rotatably connected with the second fixing part; the second rotating part of the cold water rotating assembly and the cold water valve core are respectively connected with the cold water connecting component; the second rotating part drives the cold water valve core to rotate via the cold water connecting component.

Preferably, the hot water connecting component is a bendable wire or a universal flexible shaft; the cold water connecting component is a bendable wire or a universal flexible shaft.

Preferably, the bendable wire is made of inelastic materials.

Preferably, the hot and cold water faucet also comprises a faucet body and a water outlet hose; the mixed water outlet of the hot and cold water mixer is connected with a water inlet end of the faucet body via the water outlet hose.

Preferably, the water outlet hose is a bendable hose.

Preferably, the hot and cold water faucet also comprises a joint with one end detachably connected with a water inlet end of the water outlet hose and another end detachably connected with the mixed water outlet.

Preferably, the hot and cold water faucet also comprises a fixing ring; external threads and a limiting block are provided around an external circumference of the faucet body and are arranged in sequential order according to a direction of water flow in the faucet body; an inner wall of the fixing ring is provided with first internal threads threadedly connected with the external threads of the faucet body; an inner wall of the water outlet hose is provided with second internal threads threadedly connected with the external threads of the faucet body.

Preferably, one end of the fixing ring proximal to the limiting block is provided with an elastic cushion.

Preferably, the hot and cold water faucet comprises a hot water one-way valve and a cold water one-way valve, both provided in the hot and cold water mixer; the hot water inlet is in communication with the mixed water outlet via the hot water one-way valve, and the cold water inlet is in communication with the mixed water outlet via the cold water one-way valve.

Preferably, the hot and cold water faucet comprises a fixing component; the hot and cold water mixer is detachably connected with the fixing component.

Preferably, the hot and cold water mixer is clamped to the fixing component.

Preferably, the first fixing part is provided with a first through-hole which the hot water connecting component passes through, and the second fixing part is provided with a second through-hole which the cold water connecting component passes through.

Preferably, the hot water connecting component is detachably connected with the hot water valve core, and the cold water connecting component is detachably connected with the cold water valve core.

Preferably, the hot water connecting component is provided with a hot water connecting sleeve which is provided with a hot water connecting hole into which the hot water valve core is extended; an inner wall of the hot water connecting hole is provided with hot water connecting slots; hot water mating blocks are provided on an outer circumference of the hot water valve core; the hot water mating blocks extend into the hot water connecting slots; the cold water connecting component is provided with a cold water connecting sleeve which is provided with a cold water connecting hole into which the cold water valve core is extended; an inner wall of the cold water connecting hole is provided with cold water connecting slots; cold water mating blocks are provided on an outer circumference of the cold water valve core; the cold water mating blocks extend into the cold water connecting slots.

The benefits of the present utility model are:

The hot water connecting component and the cold water connecting component extend the distance between the hot water rotating assembly and the hot water valve core, as well as the distance between the cold water rotating assembly and the cold water valve core. This allows the hot water valve core and the cold water valve core to be provided underneath the countertop, and hence guarantees that no water will accumulate on the countertop even if the valve cores are damaged.

Figure 1:
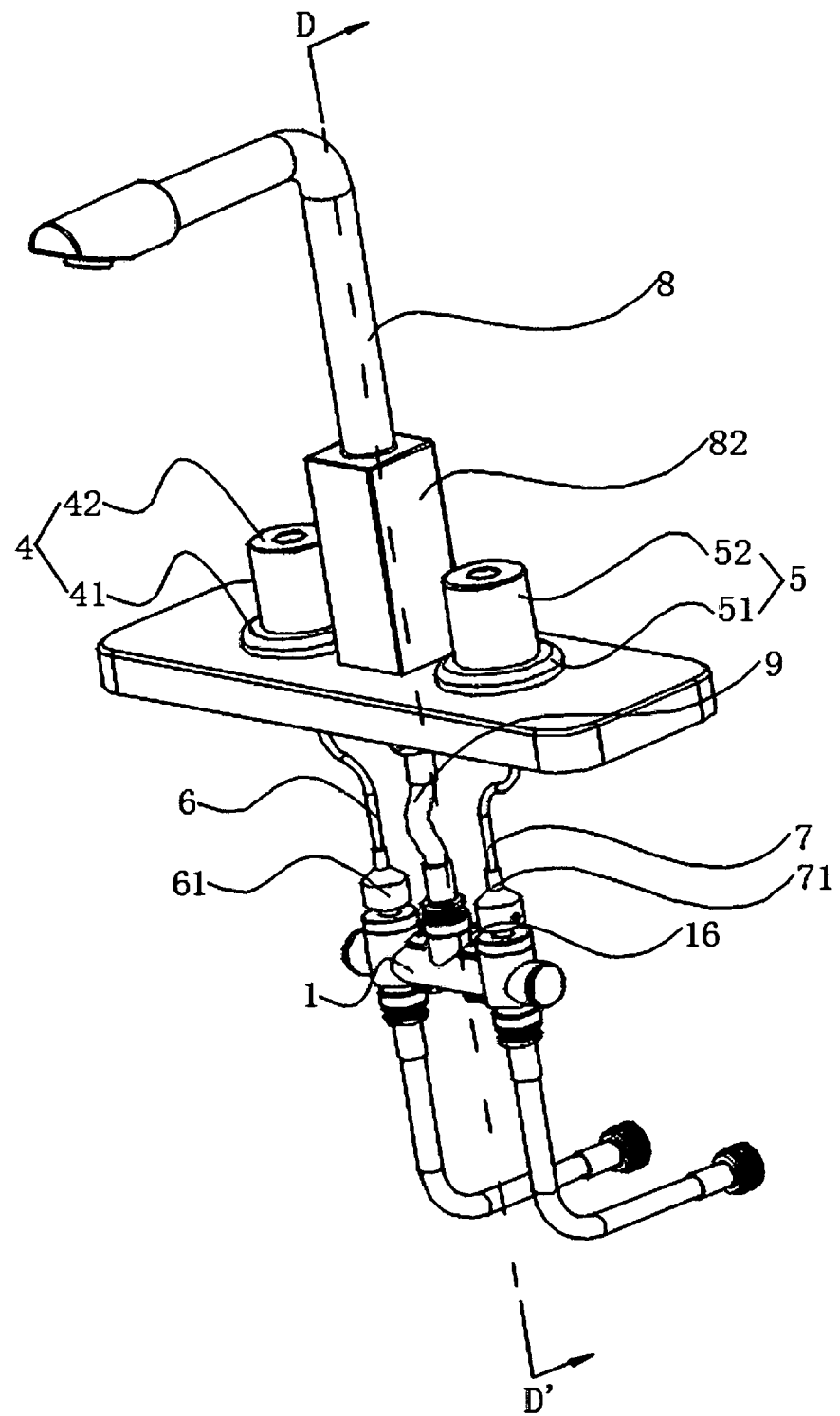
FIG. 1 is a perspective structural view of an embodiment of the present utility model.

In the figures: 1 denotes the hot and cold water mixer; 11 denotes the hot water inlet; 12 denotes the cold water inlet; 13 denotes the mixed water outlet; 14 denotes the hot water one-way valve, 15 denotes the cold water one-way valve; 16 denotes the fixing component; 2 denotes the hot water valve; 21 denotes the hot water valve core; 22 denotes the hot water mating blocks; 3 denotes the cold water valve; 31 denotes the cold water valve core; 32 denotes the cold water mating blocks; 4 denotes the hot water rotating assembly; 41 denotes the first fixing part; 411 denotes the first through-hole; 42 denotes the first rotating part; 5 denotes the cold water rotating assembly; 51 denotes the second fixing part; 511 denotes the second through-hole; 52 denotes the second rotating part; 6 denotes the hot water connecting component 61 denotes the hot water connecting sleeve; 62 denotes the hot water connecting slot; 63 denotes the hot water connecting hole; 7 denotes the cold water connecting component; 71 denotes the cold water connecting sleeve; 72 denotes the cold water connecting hole; 73 denotes the cold water connecting slot; 8 denotes the faucet body; 81 denotes the external threads; 82 denotes the limiting block; 9 denotes the water outlet hose; 91 denotes the joint; 92 denotes the fixing ring; 921 denotes the first internal threads; 922 denotes the elastic cushion; 93 denotes the second internal threads: 100 denotes the sink deck.

DETAILED DESCRIPTION OF THE UTILITY MODEL

For the ease of the understanding by those skilled in the art, the utility model will be further described as follows with reference to the accompanying drawings. The contents disclosed by the embodiments described below shall not be deemed as limiting the scope of the utility model.

A hot and cold water faucet, comprising a hot and cold water mixer 1, a hot water valve 2, a cold water valve 3, a hot water rotating assembly 4 mounted on a sink deck 100, a cold water rotating assembly 5 mounted on a sink deck 100, a hot water connecting component 6 and a cold water connecting component 7. The hot water valve 2 is positioned immediately adjacent to the hot and cold water mixer 1 and under the sink deck 100. The cold water valve 3 is positioned immediately adjacent to the hot and cold water mixer 1 and under the sink deck 100. The hot and cold water mixer 1 is provided with a hot water inlet 11, a cold water inlet 12 and a mixed water outlet 13. A water outlet end of the hot water valve 2 is in communication with the hot water inlet 11, and a water outlet end of the cold water valve 3 is in communication with the cold water inlet 12. The hot water valve 2 is provided with a hot water valve core 21. The hot water rotating assembly 4 comprises a first fixing part 41 and a first rotating part 42 rotatably connected with the first fixing part 41. The first rotating part 42 of the hot water rotating assembly 4 and the hot water valve core 21 are respectively connected with the hot water connecting component 6. The first rotating part 42 drives the hot water valve core 21 to rotate via the hot water connecting component 6. The cold water valve 3 is provided with a cold water valve core 31. The cold water rotating assembly 5 comprises a second fixing part 51 and a second rotating part 52 rotatably connected with the second fixing part 51. The second rotating part 52 cold water rotating assembly 5 and the cold water valve core 31 are respectively connected with the cold water connecting component 7. The second rotating part 52 drives the cold water valve core 31 to rotate via the cold water connecting component 7.

During installation of the hot and cold water faucet of said embodiment, install the hot water rotating assembly 4 and the cold water rotating assembly 5 on a countertop. The hot water connecting component 6 and the cold water connecting component 7 are configured to pass through through-holes on the countertop and connected with the hot water valve core 21 of the hot water valve 2 and the cold water valve core 31 of the cold water valve 3 respectively. Take the use of hot water as an example, when the user needs hot water or needs to cut off the hot water supply, rotate the hot water rotating assembly 4 on the countertop to drive the hot water valve core 21 to rotate via the hot water connecting component 6, and thus change the aperture of the hot water valve 2. Similarly, when the user needs cold water, rotate the cold water rotating assembly 5 on the countertop. When the user needs to regulate the water temperature, rotate both the hot water rotating assembly 4 and the cold water rotating assembly 5. The hot water valve 2 and the cold water valve 3 are valves commonly used in the prior art and so will not be described herein again.

In some of the embodiments, to adapt the hot water rotating assembly 4 and the cold water rotating assembly 5 to countertop through-holes of different positions, in other words, to make the relative positions of the hot water rotating assembly 4, the cold water rotating assembly 5, the hot water valve 2 and the cold water valve 3 adjustable, the hot water connecting component 6 is a bendable wire or a universal flexible shaft, so is the cold water connecting component 7. To prevent excessive circumferential deformation of the hot water connecting component 6 and the cold water connecting component 7 during rotation, which may otherwise cause longer rotating time to actually act on the hot water valve core 21 or the cold water valve core 31, the bendable wires are preferably made of inelastic materials, specifically metallic bendable wires or bellow tubes made of hard plastic.

Specifically, the hot and cold water faucet also comprises a faucet body 8 and water outlet hose 9. The mixed water outlet 13 of the hot and cold water mixer 1 is connected with a water inlet end of the faucet body 8 via the water outlet hose 9. In some embodiments, the water outlet hose 9 is a bendable hose so that the installing position of faucet body 8 is adjustable.

Figure 2:
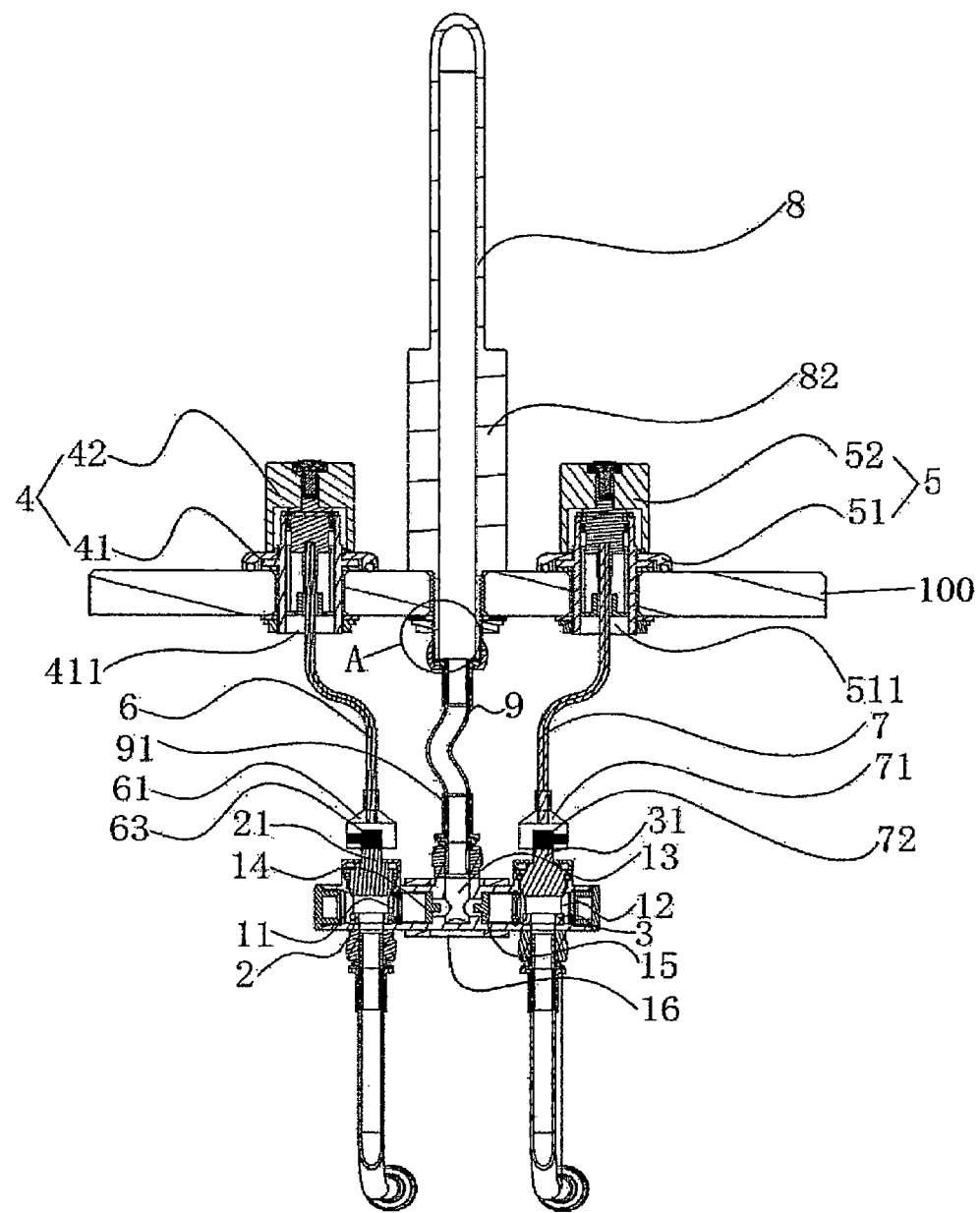
FIG. 2 is a cross-sectional view of FIG. 1 along D-D'.
Figure 3:
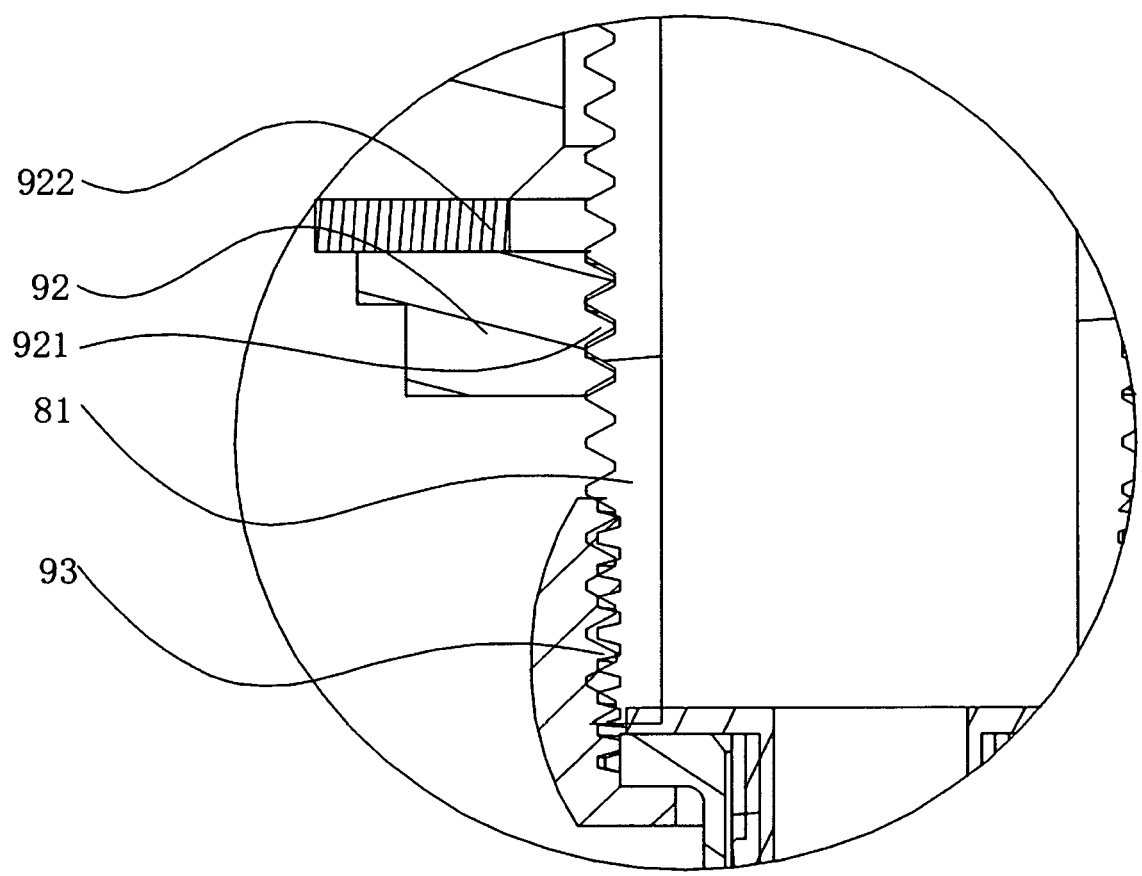
FIG. 3 is an enlarged view of part A in FIG. 2.
Figure 4:
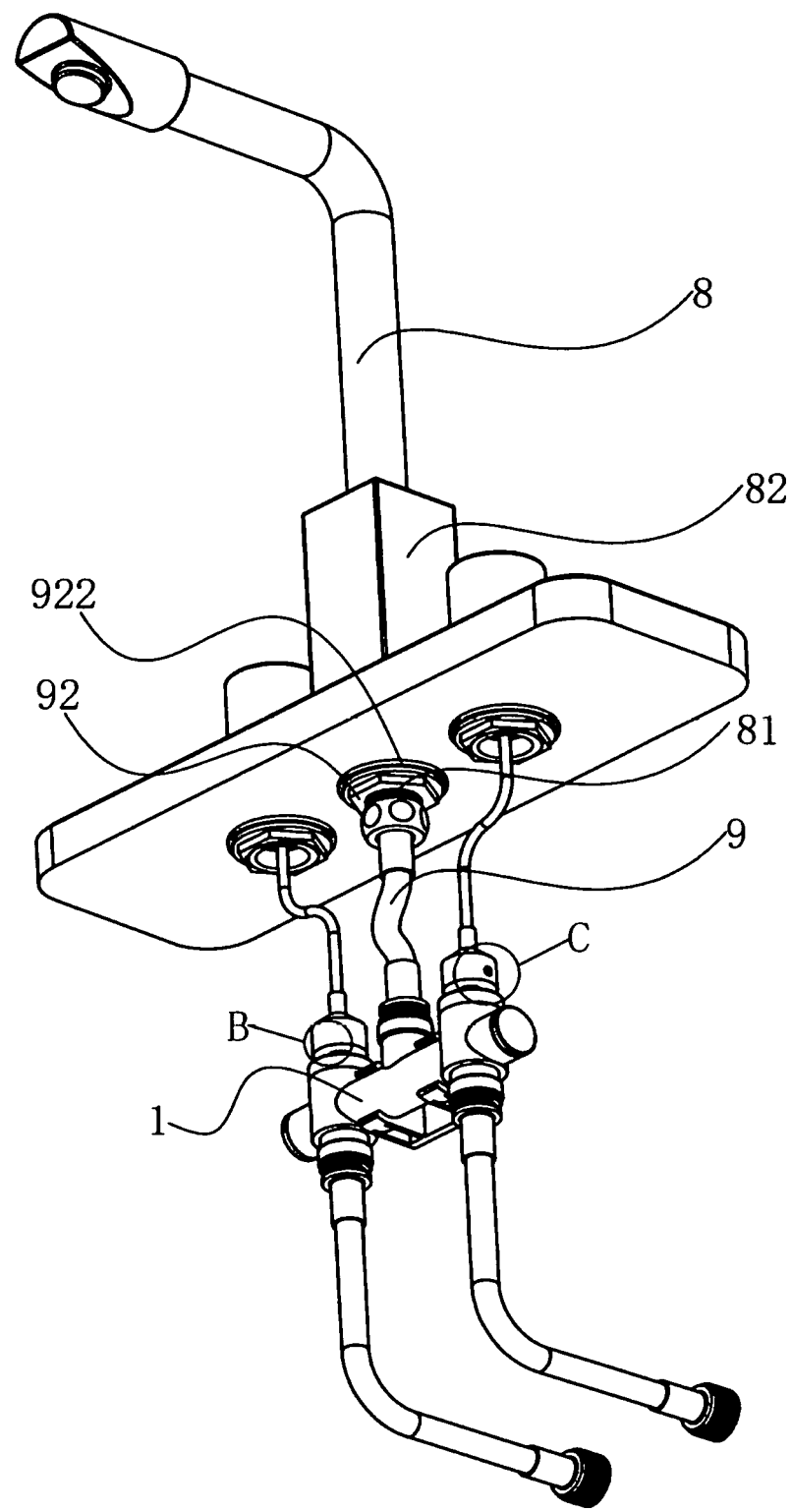
FIG. 4 is another perspective view of the embodiment of the present utility model.
Figure 5:
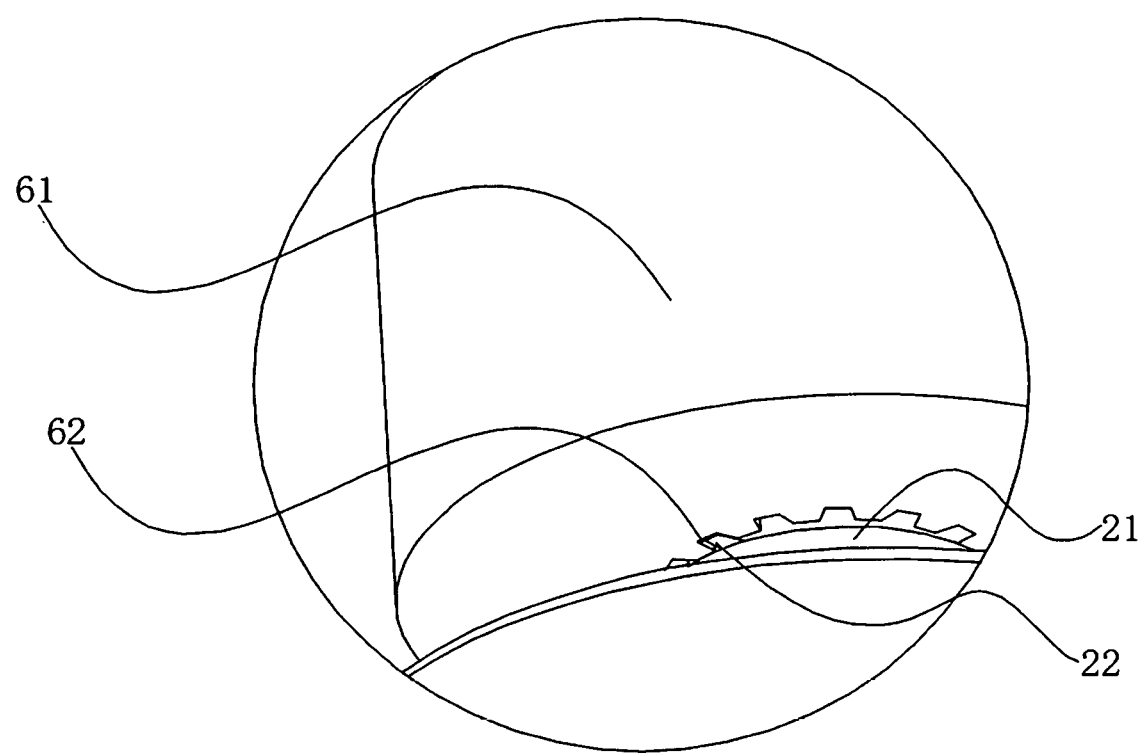
FIG. 5 is an enlarged view of part B in FIG. 4.
Figure 6:
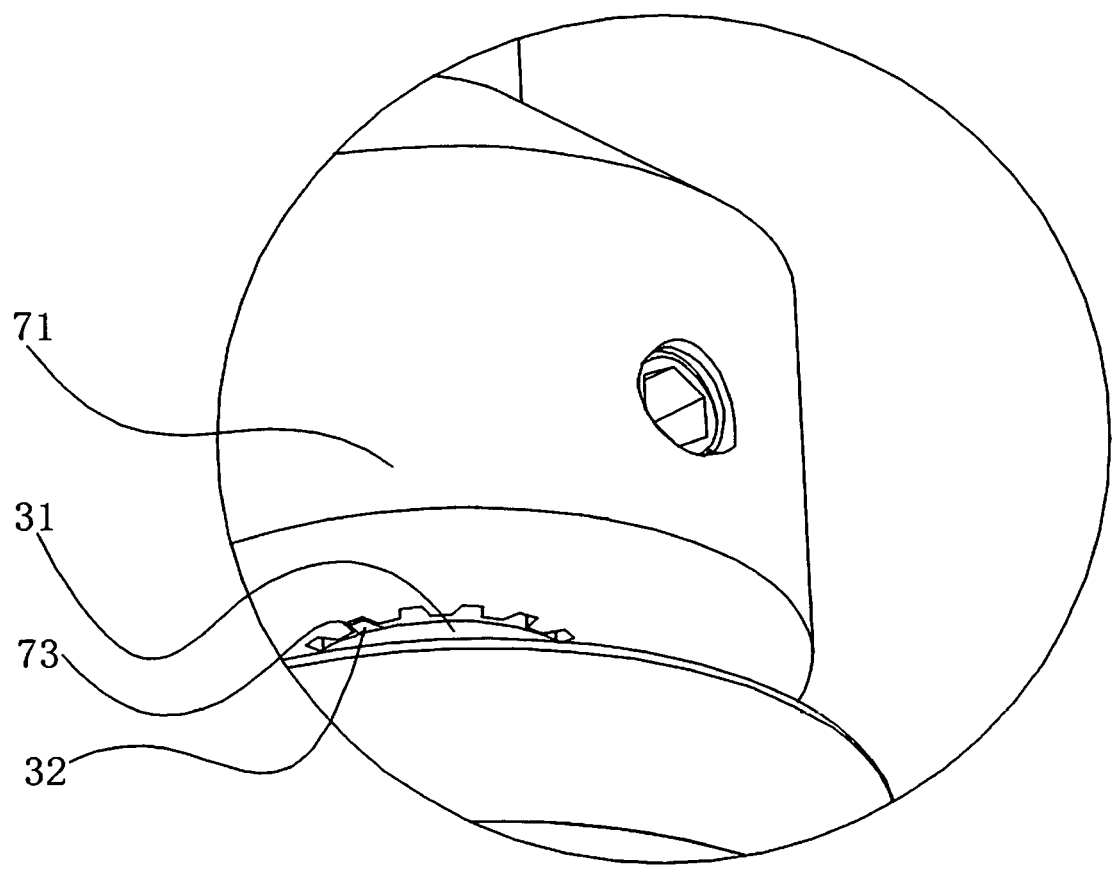
FIG. 6 is an enlarged view of part C in FIG. 4.
Figure 7:
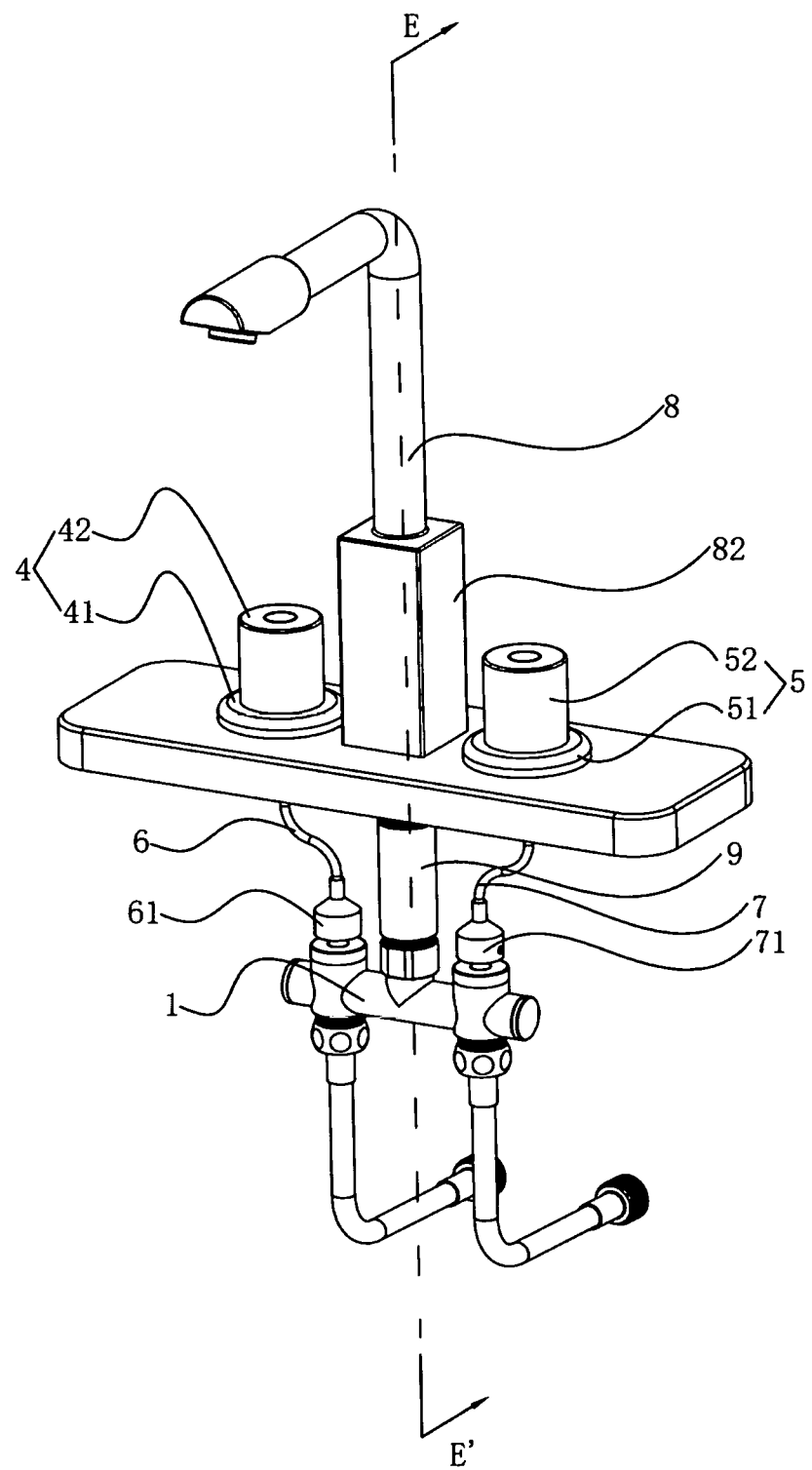
FIG. 7 is a perspective view of another embodiment of the present utility model.
Figure 8:
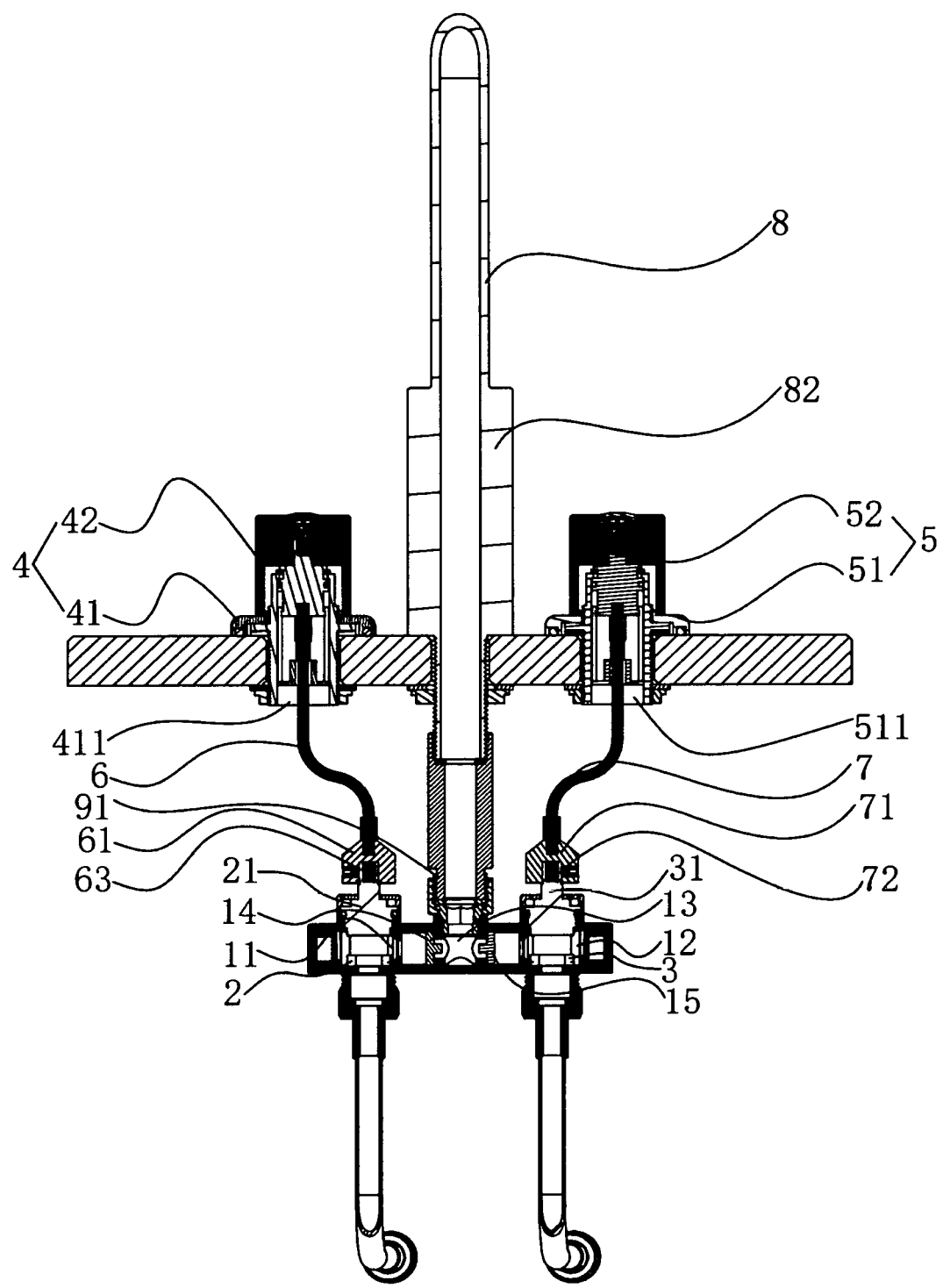
FIG. 8 is a cross-sectional view of FIG. 7 along E-E'.

To achieve quicker connection of the water outlet hose 9 and the hot and cold water mixer 1, the hot and cold water faucet also comprises a joint 91 with one end detachably connected with a water inlet end of the water outlet hose 9 and another end detachably connected with the mixed water outlet 13. In some of the embodiments, as shown in FIG. 1 and FIG. 2, the joint 91 clamps the water inlet end of the water outlet hose 9 and the mixed water outlet 13 of the hot and cold water mixer 1 once the water inlet end of the water outlet hose 9 and the mixed water outlet 13 of the hot and cold water mixer 1 are plugged into the joint 91. In some other embodiments, as shown in FIG. 7 and FIG. 8, the joint 91 is threaded with the water inlet end of the water outlet hose 9 and the mixed water outlet 13.

In some embodiments, the hot and cold water faucet also comprises a fixing ring 92. External threads 81 and a limiting block 82 are provided around an external circumference of the faucet body 8 and are arranged in sequential order according to a direction of water flow in the faucet body 8. An inner wall of the fixing ring 92 is provided with first internal threads 921 to thread with the external threads 81 of the faucet body 8. An inner wall of the water outlet hose 9 is provided with second internal threads 93 to thread with the external threads 81 of the faucet body 8. During installation of the faucet body 8, a portion of the faucet 8 containing the external threads 81 is configured to pass through a through-hole on the countertop until the limiting block 82 touches the countertop. After threading the fixing ring 92 with the external threads 81, the fixing ring 92 and the limiting block 82 clamps the countertop so to fix the faucet body 8 in position. After that, thread the water outlet hose 9 with the faucet body 8 so that they are in communication with each other and also further fix the fixing ring 92 to prevent it from loosening. Furthermore, one end of the fixing ring 92 proximal to the limiting block 82 is provided with an elastic cushion 922 to prevent the fixing ring 92 from scratching the countertop.

In some embodiment, to ensure normal cold water supply even if the hot water valve 2 is damaged, and normal hot water supply even if the cold water valve 3 is damaged, the hot and cold water faucet comprises a hot water one-way valve 14 and a cold water one-way valve 15, both provided in the hot and cold water mixer 1. The hot water inlet 11 is in communication with the mixed water outlet 13 via the hot water one-way valve 14, and the cold water inlet 12 is in communication with the mixed water outlet 13 via the cold water one-way valve 15. Water only flows in one direction from the hot water inlet 11 to the mixed water outlet 13 but not vice versa, or in one direction from the cold water inlet 12 to the mixed water outlet 13 but not vice versa. Hence, even when the hot water valve 2 is damaged, cold water will not flow out from the hot water valve 2; and even when cold water valve 3 is damaged, hot water will not flow out from the cold water valve 3.

Furthermore, the hot and cold water faucet comprises a fixing component 16. The hot and cold water mixer 1 is detachably connected with the fixing component 16. During installation, fix the fixing component 16 to a wall surface by threaded connection or adhesive, and then connect the hot and cold water mixer 1 to the fixing component 16. This is more convenient to remove the hot and cold water mixer 1 for checking and maintenance. Specifically, the hot and cold water mixer 1 is clamped to the fixing component 16.

In some of the embodiment, the first fixing part 41 is provided with a first through-hole 411 for the hot water connecting component 6 to pass through, and the second fixing part 51 is provided with a second through-hole 511 for the cold water connecting component 7 to pass through. This allows the hot water connecting component 6 to stably connect with a rotating shaft of the first rotating part 42, and allows the cold water connecting component 7 to stably connect with a rotating shaft of the second rotating part 52.

In some embodiments, the hot water connecting component 6 is detachably connected with the hot water valve core 21, and the cold water connecting component 7 is detachably connected with the cold water valve core 31. This is more convenient for installation, checking and maintenance.

Furthermore, the hot water connecting component 6 is provided with a hot water connecting sleeve 61 which is provided with a hot water connecting hole 63 for the hot water valve core 21 to extend into. An inner wall of the hot water connecting hole 63 is provided with hot water connecting slots 62. Hot water mating blocks 22 are provided on an outer circumference of the hot water valve core 21; the hot water mating blocks 22 extend into the hot water connecting slots 62. The cold water connecting component 7 is provided with a cold water connecting sleeve 71 which is provided with a cold water connecting hole 72 for the cold water valve core 31 to extend into. An inner wall of the cold water connecting hole 72 is provided with cold water connecting slots 73. Cold water mating blocks 32 are provided on an outer circumference of the cold water valve core 31; the cold water mating blocks 32 extend into the cold water connecting slots 73. This is to prevent skidding between the hot water connecting sleeve 61 and the hot water valve core 21 and between the cold water connecting sleeve 71 and the cold water valve core 31.

The above content presents the preferred embodiments of the present utility model but does not intend to limit the protection scope of the utility model. Any changes or improvements for the purpose of achieving other embodiments of equivalent technical effects made by a person skilled in this field of art in accordance with the teachings of the present utility model without deviating from the scope of the present utility model should also fall within the scope of protection of the present utility model.

What is claimed is:

1. A hot and cold water faucet, comprising a hot and cold water mixer, a hot water rotating assembly mounted on a sink deck, a cold water rotating assembly mounted on the sink deck, a hot water valve positioned immediately adjacent to the hot and cold water mixer and under the sink deck, a cold water valve positioned immediately adjacent to the hot and cold water mixer and under the sink deck; a hot water connecting component and a cold water connecting component; the hot and cold water mixer is provided with a hot water inlet, a cold water inlet and a mixed water outlet; a water outlet end of the hot water valve is in communication with the hot water inlet, and a water outlet end of the cold water valve is in communication with the cold water inlet; the hot water valve is provided with a hot water valve core; the hot water rotating assembly comprises a first fixing part and a first rotating part rotatably connected with the first fixing part; the first rotating part of the hot water rotating assembly and the hot water valve core are respectively connected with the hot water connecting component; the first rotating part drives the hot water valve core to rotate via the hot water connecting component; the cold water valve is provided with a cold water valve core; the cold water rotating assembly comprises a second fixing part and a second rotating part rotatably connected with the second fixing part; the second rotating part of the cold water rotating assembly and the cold water valve core are respectively connected with the cold water connecting component; the second rotating part drives the cold water valve core to rotate via the cold water connecting component.

2. The hot and cold water faucet of claim 1, wherein the hot water connecting component is a bendable wire or a universal flexible shaft; the cold water connecting component is a bendable wire or a universal flexible shaft.

3. The hot and cold water faucet of claim 2, wherein the hot water connecting component is a bendable wire made of inelastic materials; the cold water connecting component is a bendable wire made of inelastic materials.

4. The hot and cold water faucet of claim 1, wherein the hot and cold water faucet also comprises a faucet body and a water outlet hose; the mixed water outlet of the hot and cold water mixer is connected with a water inlet end of the faucet body via the water outlet hose.

5. The hot and cold water faucet of claim 4, wherein the water outlet hose is a bendable hose.

6. The hot and cold water faucet of claim 4, wherein the hot and cold water faucet also comprises a joint with one end detachably connected with a water inlet end of the water outlet hose and another end detachably connected with the mixed water outlet.

7. The hot and cold water faucet of claim 4, wherein the hot and cold water faucet also comprises a fixing ring; external threads and a limiting block are provided around an external circumference of the faucet body and are arranged in sequential order according to a direction of water flow in the faucet body; an inner wall of the fixing ring is provided with first internal threads threadedly connected with the external threads of the faucet body; an inner wall of the water outlet hose is provided with second internal threads threadedly connected with the external threads of the faucet body.

8. The hot and cold water faucet of claim 7, wherein one end of the fixing ring proximal to the limiting block is provided with an elastic cushion.

9. The hot and cold water faucet of claim 1, wherein the hot and cold water faucet comprises a hot water one-way valve and a cold water one-way valve, both provided in the hot and cold water mixer; the hot water inlet is in communication with the mixed water outlet via the hot water one-way valve, and the cold water inlet is in communication with the mixed water outlet via the cold water one-way valve.

10. The hot and cold water faucet of claim 1, wherein the hot and cold water faucet comprises a fixing component; the hot and cold water mixer is detachably connected with the fixing component.

11. The hot and cold water faucet of claim 10, wherein the hot and cold water mixer is clamped to the fixing component.

12. The hot and cold water faucet of claim 1, wherein the first fixing part is provided with a first through-hole which the hot water connecting component passes through, and the second fixing part is provided with a second through-hole which the cold water connecting component passes through.

13. The hot and cold water faucet of claim 1, wherein the hot water connecting component is detachably connected with the hot water valve core, and the cold water connecting component is detachably connected with the cold water valve core.

14. The hot and cold water faucet of claim 13, wherein the hot water connecting component is provided with a hot water connecting sleeve which is provided with a hot water connecting hole into which the hot water valve core is extended; an inner wall of the hot water connecting hole is provided with hot water connecting slots; hot water mating blocks are provided on an outer circumference of the hot water valve core; the hot water mating blocks extend into the hot water connecting slots; the cold water connecting component is provided with a cold water connecting sleeve which is provided with a cold water connecting hole into which the cold water valve core is extended; an inner wall of the cold water connecting hole is provided with cold water connecting slots; cold water mating blocks are provided on an outer circumference of the cold water valve core; the cold water mating blocks extend into the cold water connecting slots.

* * * * *